June 29, 1954 J. O. EDSON 2,682,575

TIME DIVISION MULTIPLEX SYSTEM

Filed Oct. 19, 1944

4 Sheets-Sheet 1

INVENTOR
J. O. EDSON
BY G. H. Stevenson
ATTORNEY

June 29, 1954 J. O. EDSON 2,682,575

TIME DIVISION MULTIPLEX SYSTEM

Filed Oct. 19, 1944

4 Sheets-Sheet 2

INVENTOR
J. O. EDSON
BY G. H. Stevenson
ATTORNEY

June 29, 1954 J. O. EDSON 2,682,575

TIME DIVISION MULTIPLEX SYSTEM

Filed Oct. 19, 1944

4 Sheets-Sheet 3

INVENTOR
J. O. EDSON
BY G. H. Stevenson
ATTORNEY

June 29, 1954 J. O. EDSON 2,682,575

TIME DIVISION MULTIPLEX SYSTEM

Filed Oct. 19, 1944 4 Sheets-Sheet 4

INVENTOR
J. O. EDSON
BY G. H. Stevenson
ATTORNEY

Patented June 29, 1954

2,682,575

UNITED STATES PATENT OFFICE 2,682,575

TIME DIVISION MULTIPLEX SYSTEM

James O. Edson, Great Kills, N. Y., assignor to Bell Telephone Laboratories, Incorporated, New York, N. Y., a corporation of New York Application October 19, 1944, Serial No. 559,354

21 Claims. (Cl. 179—15)

This invention relates to multiplex telephony and more particularly to multiplex systems in which the common transmission path is shared by the several communication channels on a time division basis.

Objects of the invention comprise the improvement of the signal-to-noise ratio in the several communication channels, diminution of interchannel crosstalk, simplification of the transmitting multiplex equipment, and provision for calling and alarm signals.

The invention makes use of the method of pulse position, or pulse phase, modulation according to which uniform pulses of very short duration recurring at a rate at least twice as great as the highest signal frequency are modulated in time position or phase in accordance with the signal to be transmitted. For telephone communication where the speech band may be restricted to the frequency range below about 3500 cycles per second, a pulse recurrence rate of about 8000 cycles per second and a pulse length of about one microsecond would be typical.

In accordance with the invention multiplex operation is accomplished by dividing the period corresponding to the recurrence rate into a number of equal smaller intervals corresponding to the desired number of channels together with an additional shorter interval for use in synchronizing. Thus in the case of an eight-channel system the recurrence period of 125 microseconds would be divided into eight channel periods of 15 microseconds each and a synchronizing period of five microseconds. The recurrence frequency is generated by a stable marker oscillator from the output of which there are derived a train of short pulses, eight for each cycle, normally timed to occur at the mid-points of the channel times, and a longer pulse for synchronizing which occurs in the synchronizing period and marks the beginning of a cycle. Modulation of the pulses by the signal waves varies their positions or phases with respect to the mid-period times, the degree of modulation being limited so that the pulses in any particular channel do not move outside the channel period.

Each group of pulses including the synchronizing pulse may be called a frame, the timing of each channel pulse being controlled in relation to the start of the frame in which it appears. Since each frame is to this extent independent of the others, the system has some of the characteristics of a start-stop system.

At a receiving point the synchronizing pulses are separated from the others by virtue of their greater length and are employed to generate in the receiving apparatus for each channel gating pulses coincident and coextensive with the channel period. These pulses condition the receiving apparatus to respond selectively to the signal pulses corresponding to that channel. In the receiving circuits the selected position modulated pulses are converted into length modulated pulses lasting from the occurrence of the signal pulse to the end of the gate pulse. These length modulated pulses contain the signal which is received by filtering out all components of the pulses outside the signal range.

An important feature of the invention, which contributes greatly to the signal-to-noise improvement, is the derivation of new pulses at the receiver from the trailing edges of the received pulses as a first step. I have found that under practical conditions of operation, particularly where the pulses are transmitted by radio as trains of high frequency waves, the timing of the leading edges of the received pulses becomes uncertain whereas the timing of the trailing edges is not affected. If the leading edges are allowed to control the processes of reception and detection, the effect of the timing uncertainty is to increase the noise accompanying the demodulated signal. This noise is substantially eliminated by controlling the processes by the trailing edges of the pulses.

Another feature of the invention lies in the arrangements providing for the use of relaxation circuits in the generation of the position modulated pulses. The use of such circuits results in a very substantial reduction in the number of vacuum tubes required as compared with other methods. It is necessary, however, that they be allowed adequate time between successive operations for their complete relaxation. To provide this the several channels at the transmitter are divided into two groups which are started at different epochs of the marker oscillator period.

These and other features of the invention and its mode of operation will be more fully understood from the following detailed description of a typical embodiment and by reference to the accompanying drawings of which:

Figs. 1*a* and 1*b* are block diagrams illustrating the schematic arrangement of a complete multiplex system in accordance with the invention;

Figure 1B:
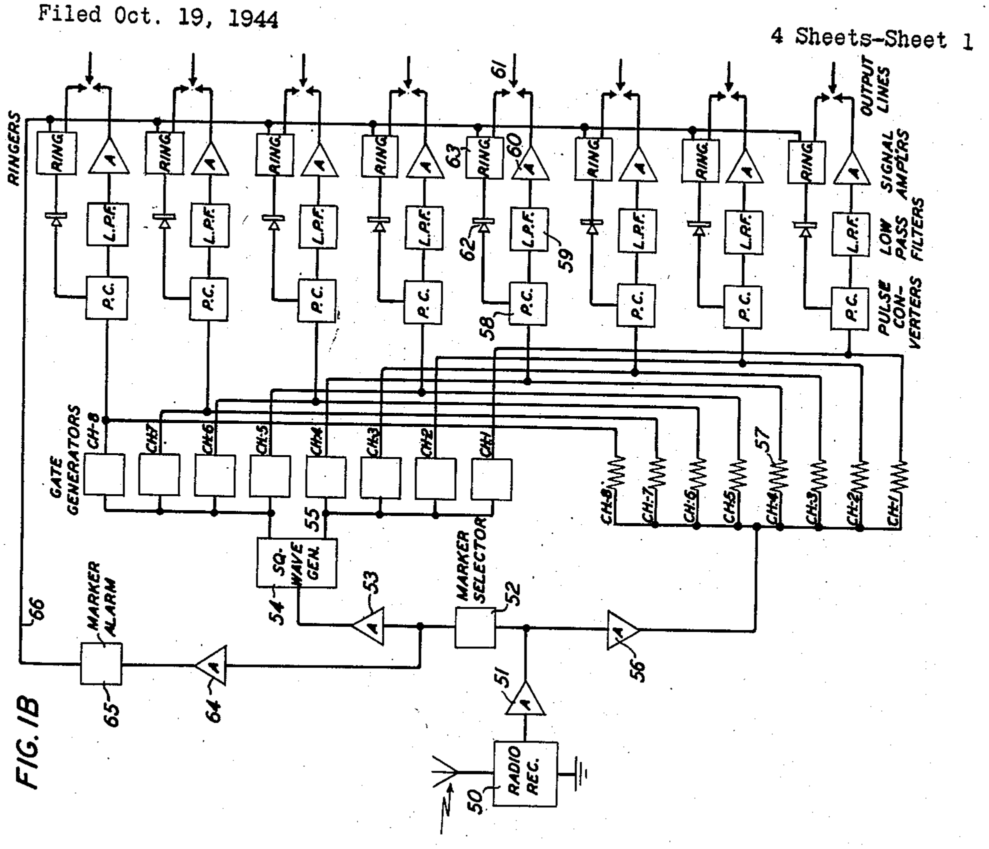
Figure 1A:
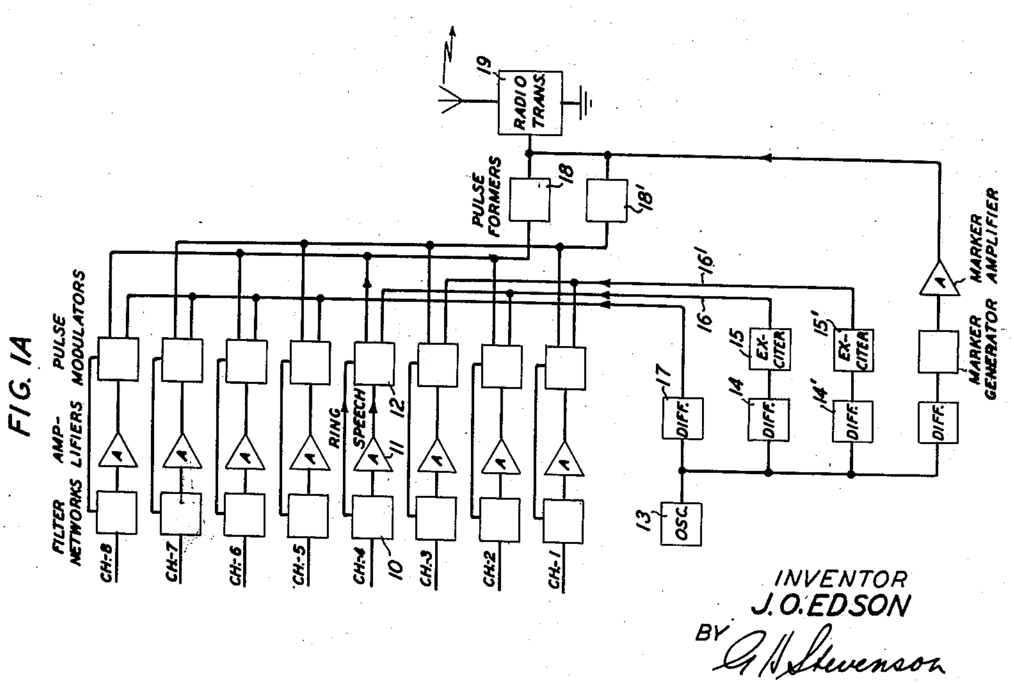

The block diagrams of Figs. 1*a* and 1*b* show the arrangement of the terminal apparatus in an eight channel multiplex system embodying the invention. Apparatus for one-way communication only is shown, Fig. 1*a* representing a transmitting terminal and Fig. 1*b* the cooperating receiving terminal. For two-way communication duplicate apparatus disposed for transmission in the opposite direction would be provided, the channels being operated as four-wire circuits. The terminals, are shown connected by a radio link, for which use the invention is well adapted, but it will be understood that the invention is not limited to communication in this transmission medium.

The method of signal transmission is that of pulse position modulation. In accordance with this method, short unidirectional pulses recurring periodically at a rate at least twice as high as the highest frequency component in the signal are varied in their times of occurrence, or time-phases, in accordance with the signal current. For telephone communication where the signal frequencies may be limited to a band below about 3500 cycles per second, a pulse frequency of 8,000 cycles per second is satisfactory. The method may be regarded broadly as sampling the instantaneous values of the signal wave at uniform intervals 8000 times a second and sending out corresponding pulses which represent the values of the samples by the variations in their timing.

Multiplexing is effected by time division. Assuming a pulse frequency of 8000 per second for each channel, the recurrence period of 125 microseconds is divided into eight channel periods of 15 microseconds each, the extra interval of 5 microseconds being used for a synchronizing signal. The pulse modulating means in the several channels are so arranged that the pulses normally occur at the mid-points of their respective channel periods and move about within the limits of these intervals under the influence of the signal currents. The pulses from all the channels, thus separated in time, are impressed together on the common line or medium for transmission to the receiving terminal.

For radio transmission the pulses are converted into short trains of ultra-high frequency oscillations of corresponding length and timing. At the receiving terminal, these trains are received and rectified and the rectified pulses are delivered to the receiving multiplex equipment. Here they are separated by time division and directed into their respective channel circuits and are then converted into varying length pulses from which the signals can be obtained directly.

*Transmitting multiplex*

In Fig. 1A the incoming signal lines are shown at the left of the drawing and are designated channels 1 to 8, respectively. The numbering conforms to the time order of the channels in the multiplex cycle. Channel 4 will be taken as representative for the purpose of description. Currents from the incoming line enter a filter 10 which serves to separate the signal currents from low frequency currents used for ringing and also to limit the signal currents to a frequency band extending from about 200 to 3500 cycles per second. The signal currents pass to amplifier 11 and thence to pulse modulator 12 in which they bring about the modulation of the pulse timing. Ringing currents pass directly to the modulator in which they operate to produce a suitable calling signal as will be described later. All of the channels are alike up to this point, the corresponding elements in the other channels appearing at corresponding locations in the drawing.

The modulators receive short impulses at fixed instants in each multiplex period and from these generate length modulated pulses which are timed to end normally at the mid-points of the respective channel periods and which vary in length within the limits of these periods under the influence of the signal currents. The abrupt endings of the length modulated pulses are caused to energize a pulse generating and shaping system in which position modulated pulses of uniform shape and energy are produced and delivered to the common transmission line or medium. Since the pulses occur serially, the shaping system may be shared by all channels in common. However, it is advantageous, for the prevention of interchannel crosstalk, to use two shaping networks, one for the odd numbered channels and one for the even numbered channels. The two shaping networks can be matched without difficulty so that the advantage of uniformity of the outgoing pulses is not lost.

The pulses supplied to the modulators are derived from a master oscillator 13 which also furnishes a synchronizing pulse. This oscillator operates at a stable frequency of 8000 cycles per second and is designed to deliver a pulsating output voltage of substantially rectangular wave form. By means of differentiating networks, short pulses alternately positive and negative are produced at the instants the oscillator output voltage changes from one value to the other. The negative pulses are used to time the start of the multiplex cycle and also are supplied to the modulators of channels 1 to 4. The positive pulses are supplied directly to channels 5 to 8. The modulators, by virtue of their circuit design, respond only to positive pulses, consequently the negative pulses must be reversed in sign before being delivered to the lower channel group modulators.

The pulse supply for channel 4 comprises differentiating network 14, exciter 15, in which the signs of the pulses are reversed, and lead 16. These elements also supply pulses to the modulator in channel 2. Similar elements 14′, 15′ and 16′ supply pulses to channels 1 and 3. Pulses are supplied directly to channels 5 to 8 through differentiating network 17. The modulator output voltage in channel 4 is delivered to the pulse former 18, which is shared with the other even numbered channels. A similar pulse former 18′ is provided for the odd numbered channels. From these elements the modulated pulses pass to radio transmitter 19 in which they are amplified and converted to corresponding trains of ultra-high frequency oscillations suitable for radiation.

The radiated pulses may be generated most conveniently by applying the amplified pulses to the plate of an ultra-high frequency oscillator tube, thereby energizing the oscillator intermittently for the duration of each pulse. The oscillator tube may be, for example, a magnetron of the type shown in United States Patent 2,063,342, issued December 8, 1936 to A. L. Samuel. This method has the advantage that the oscillator tube operates under a low duty cycle and may be called upon to deliver pulses of large power in relation to the continuous rating of the tube. It has the disadvantage that while the oscillations stop instantly at the end of the pulse, they do not start immediately at the beginning of the pulse. The result is a slight shortening of the pulse duration, together with a slight uncertainty, or "jitter" of its starting point. Provision is made in the receiving system for avoiding the effect of this uncertainty which makes itself evident as noise.

Other methods of producing the ultra-high frequency pulses might, of course, be used. For example, the signal pulses might be employed in an obvious manner to unblock a path from a source of continuous oscillation to the antenna. In such case the uncertainty of the pulse duration would be largely eliminated, but the advantage of a low duty cycle would be lost.

*Signal input circuit*

Figure 2:
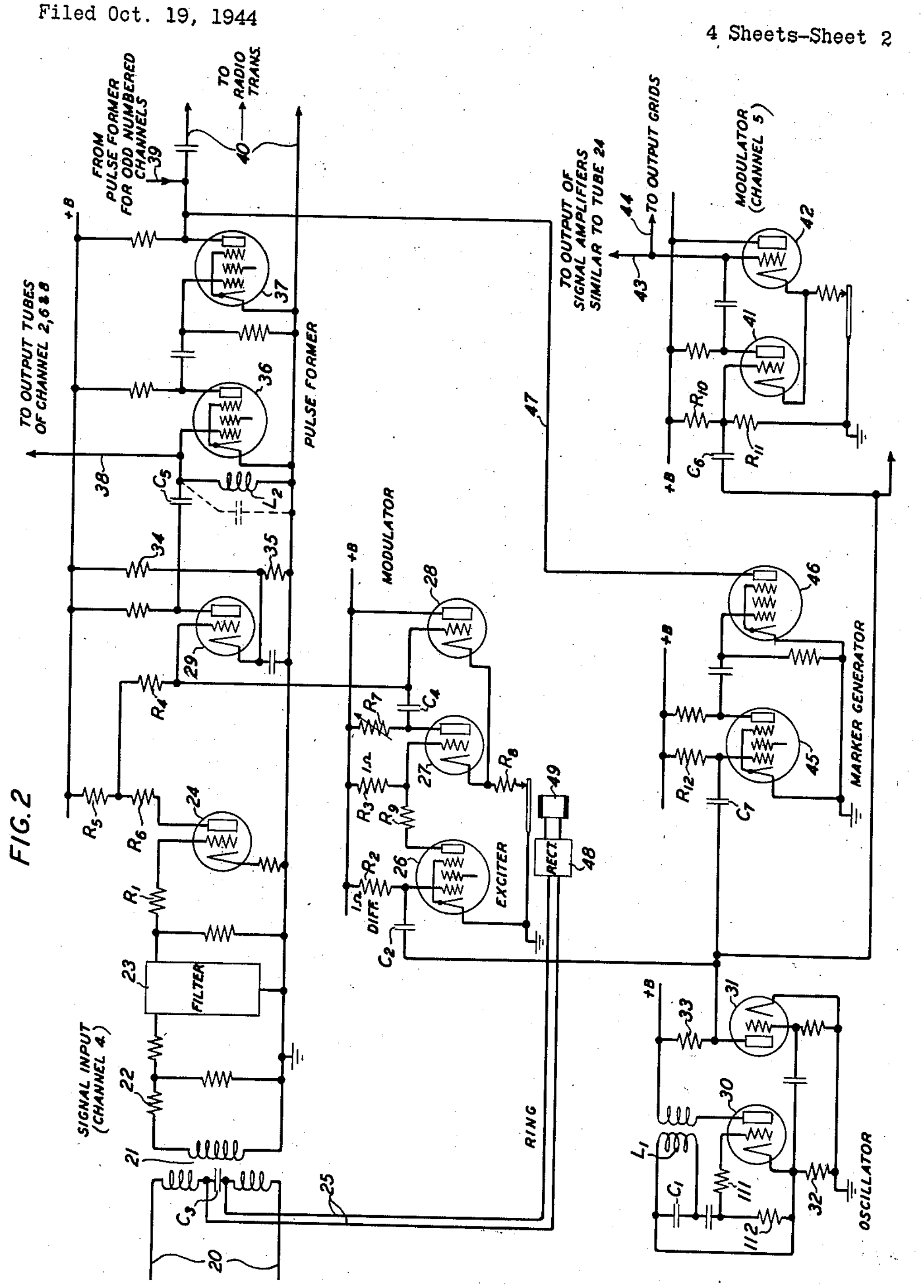
Fig. 2 is a circuit diagram of the transmitting portion of the multiplex system.

The detail circuit arrangements of the transmitting terminal, with the complete circuit of channel 4, are shown in Fig. 2. The incoming signal line 20 is connected to transformer 21 in which signal and ringing currents are separated. The signal current output path includes the transformer secondary winding, level adjusting pad 22, low-pass filter 23 which limits the signal band to about 3,500 cycles per second, and signal amplifier 24. Resistance $R_1$ in series with the grid of tube 24 serves to limit the output voltage of the tube in one direction, limiting in the other direction being effected by the tube cut-off. The primary winding of transformer 21 is divided and the two parts are connected through a condenser $C_3$ to the terminals of which are connected leads 25, forming an output circuit for low frequency ringing currents. The condenser should be such as to offer very little impedance to speech frequencies but to present a substantial impedance to ringing frequencies of about 20 cycles per second. Elements 21, 22 and 23 correspond to network 10 in Fig. 1A and amplifier 24 to amplifier 11.

Modulator 12 of Fig. 1A comprises tubes 27, 28 and 29 and their associated circuits. Before proceeding with the description of this circuit, it will be desirable to deal with the master oscillator and pulse supply circuits.

*Master oscillator*

The master oscillator comprises tubes 30 and 31 of which 30 is the oscillator proper and 31 a wave shaping amplifier. The oscillator is of the simple tuned grid circuit type comprising a tuned circuit $L_1C_1$ coupled inductively to the plate circuit of the vacuum tube and also through a stopping condenser and grid leak to the grid. The circuit is proportioned to provide strong feedback so that the vacuum tube operates in class-C fashion, that is, with its plate current flowing in spurts of less than half cycle duration. A pulsating output voltage corresponding to the plate current variation is taken from cathode lead resistor 32 and applied through a condenser to the grid of tube 31. The grid of this tube swings alternately between positive and negative voltages sufficiently great to produce alternate saturation and interruption of its plate current. The plate current to tube 31 is supplied through a high resistance, consequently the plate potential drops to a low value when the current is flowing and rises to the full value of the supply voltage when the current is interrupted. The output voltage of the tube thus develops a substantially rectangular wave form alternating each period between a low value during the plate current spurt in the oscillator tube and a high value for the remainder of the period. For an oscillation frequency of 8000 cycles per second or a periodic time of 125 microseconds, a suitable adjustment of the wave form would make the low voltage interval 35 microseconds and the high voltage interval 90 microseconds. The division of these intervals can be controlled with sufficient accuracy by adjusting the ratio of series clipping resistor 111 to the grid leak resistance 112.

It may be noted here that the "on-off" method of operating tube 31 is characteristic of the operation of most of the tubes in the system. It is obtained in the usual fashion by the use of high resistance plate supply circuits free from series inductances or by-passing condensers so that they admit of very little energy storage. Heater type tubes are used throughout, the cathode heating circuits being omitted in the drawings. Where pentodes or other multigrid tubes are indicated in the drawings, the energizing circuits for the extra grids, being of conventional types, are also omitted from the showing for the sake of clearness. In a typical system constructed in accordance with the drawings, a plate supply voltage of 300 was used.

*Exciter*

The output voltage of tube 31 is applied to the grid of exciter tube 26 through a differentiating network comprising resistance $R_2$ and condenser $C_2$, respectively, 1 megohm and 10 micro-micro-farads. Resistance $R_2$ being connected to the positive terminal of the plate supply voltage normally holds the grid at a potential just slightly above the cathode potential. When the plate of tube 31 suddenly drops to its lower potential, the change is immediately transmitted through condenser $C_2$ to the grid of tube 26 driving the grid to a negative potential sufficient to block the plate circuit. As the small capacity of the condenser charges quite rapidly through resistance $R_2$, the grid quickly regains its normal potential and unblocks the plate circuit. At the later time when the applied voltage suddenly rises, a corresponding positive pulse tends to appear at the grid of tube 26, but this pulse is very much reduced by the grid conductance. Since the tube is at this time drawing sufficient plate current to reduce its plate voltage to a very small value, the weak positive pulse on the grid has negligible effect on the output voltage.

Exciter tube 26 normally draws plate current through resistor $R_3$ which is also connected to the grid of the succeeding tube. This resistor has a resistance of 1 megohm and, together with the additional series resistance $R_9$, holds the plate potential of tube 26, at a low value. Resistance $R_9$, which may have a value of about 120,000 ohms, together with $R_3$ forms a voltage divider providing a suitable grid potential for tube 27 in the relaxed condition of the circuit. The momentary negative pulse applied to the grid of tube 26 from the differentiating network results in a corresponding positive pulse at its plate and also on the grid of tube 27.

*Modulator*

As already indicated, the modulator 12 of Fig. 1A comprises tubes 27, 28 and 29, the first two constituting a relaxation circuit, or one-shot multivibrator, characterized by a single stable condition and the last being an output tube. The relaxation circuit tubes 27 and 28 are coupled in one direction by resistor $R_7$, condenser $C_4$, together with resistors $R_4$ and $R_5$ and are coupled in the opposite direction by the common cathode lead resistor $R_8$. The couplings are so proportioned that the circuit does not oscillate and that in its normal stable condition tube 28 conducts and tube 27 is blocked. In this condition the grid of tube 27 is held, by means of resistor $R_3$ and the circuit through tube 26, at a potential substantially lower than that of its cathode.

When the grid of tube 27 is driven momentarily positive by the pulse from the exciter tube 26, its plate circuit becomes conductive and a negative pulse is transmitted through condenser $C_4$ to the grid of tube 28. By virtue of the coupling in the reversed direction through cathode resistor $R_8$, the reduction of the plate current in tube 28 due to the negative pulse proceeds very rapidly and almost instantaneously brings about a complete transfer of the plate current to tube 27. In this condition, which may be termed the strained condition, the plate current in tube 27 is less than that which had previously existed in tube 28 and is such as to hold the cathode of that tube at a potential slightly higher than the grid potential. The condition is maintained until the grid potential of tube 28 is restored by the charging of condenser $C_4$ through resistances $R_4$ and $R_5$ to a value only slightly negative with respect to the cathode whereupon the circuit returns very rapidly to its relaxed condition.

The time interval between the exciting pulse and the instant of relaxation is called the relaxation time. The principal circuit elements controlling this interval are capacity $C_4$, resistance $R_7$, and resistance $R_4$, the latter resistance being very large compared with the other resistances in the circuit. These elements are proportioned for each channel so that the relaxation takes place normally at the middle of the corresponding channel period. Ordinarily it is satisfactory to make the resistance $R_4$ the same for all channels and to control the relaxation times by varying the capacity $C_4$. The resistance may conveniently be about 3.3 megohms and the capacities may range from about 10 to about 150 micromicrofarads. Adjustment of the relaxation time to make up for variations in other constants is accomplished by adjusting $R_7$ which controls the change of voltage applied to grid of tube 28 in the strained condition and so varies the time.

Figure 4:
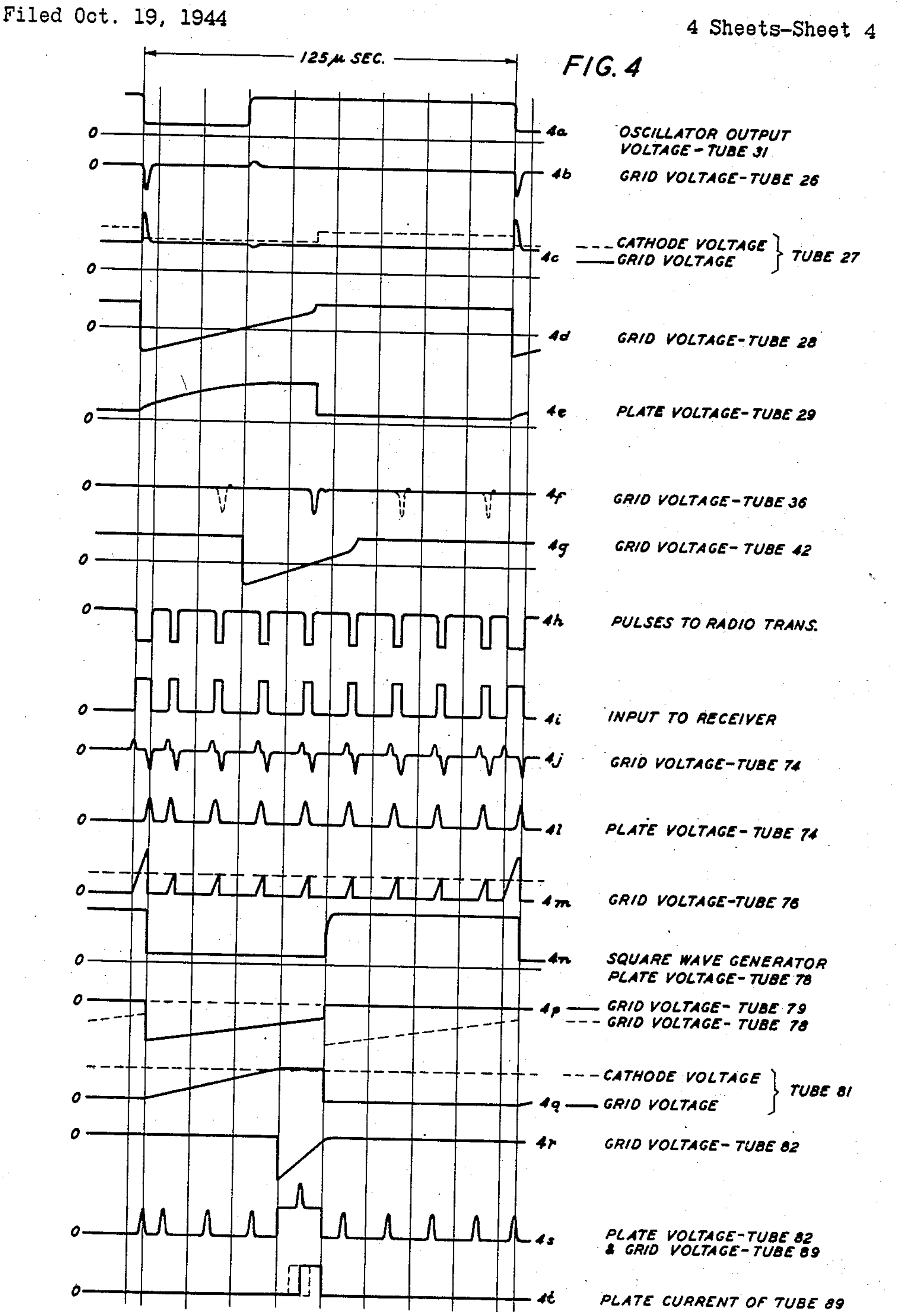
Fig. 4 is a series of diagrams showing the character of the voltages at various points in the system and explanatory of the operation of the invention.

The character of the voltage variations in the parts of the system so far described are illustrated by the diagrams *a* to *d* in Fig. 4. The various lines represent the voltages as functions of time during one complete cycle of the master oscillation, that is, for one complete multiplex cycle. The light vertical lines indicate the division of the period into eight channel periods and one shorter synchronizing period. Graph *a* represents the oscillator output voltage at the plate of tube 31. The multiplex cycle starts at the instant this voltage drops from its high to its low value as indicated in the drawing. The two parts of the wave last 35 and 90 microseconds, respectively. Graph *b* shows the voltage pulses on the grid of exciter tube 26 resulting from the action of the differentiating network. The positive pulse occurring when the oscillator voltage suddenly increases is curbed somewhat by the flow of grid current. The full line curve in *c* shows the starting pulse on the grid of tube 27 of the relaxation circuit corresponding to the negative pulse on the exciter grid but reversed in sign. The slight effect of the succeeding positive pulse is also indicated. The dotted line shows the common cathode potential of the relaxation circuit tubes in relation to the grid potential of tube 27. Graph *d* shows the potential variation at the grid of tube 28 and its recovery to its original value at the midpoint of channel 4 period. This graph represents also the grid potential of output tube 29. The grid voltage starts at about the same potential as the cathodes in the relaxed condition of the circuit. Upon the arrival of the exciting pulse followed by the sudden transfer of the plate current, it drops sharply by the same amount as the drop of the plate potential in tube 27. The voltage begins to recover immediately and continues to do so at a substantially uniform rate until it reaches a value about equal to the diminished cathode potential. At this point relaxation takes place and the potential rises rapidly to its original value. This is indicated by the small step at the end of the sloping part of the graph.

The length of the relaxation time depends not only on the time constant $R_4C_4$ but also on the effective value of the voltage charging condenser $C_4$. It can be controlled to some extent by the adjustment of resistance $R_7$ since this determines the initial swing of the plate voltage in tube 27 and hence of the grid of tube 28. This adjustment may be used for the final centering of the channel pulses and for readjustment when a new tube is required.

To bring about the modulation of the relaxation time by the signal voltage, resistance $R_4$ is connected to the junction point of two resistances $R_5$ and $R_6$ which together form the load resistance of signal amplifier tube 24. In this way a part of the signal voltage is superimposed on the charging voltage and the rate of charging is increased or decreased accordingly. The signal voltage is effective only during the charging time and, since this is only a fraction of the recurrence period, the voltage may be regarded as being substantially constant and as being representative of the instantaneous value of the signal.

Output tube 29 is so arranged that its plate circuit is blocked at the same time as that of tube 28 and is suddenly unblocked at the instant of relaxation, the sudden unblocking being used to create the position modulated channel pulse. This tube serves also to stabilize the timing of the relaxation circuit. By means of potential dividing resistances 34 and 35, the latter of which is shunted by a relatively large capacity, the cathode of tube 29 is held at a fixed potential slightly lower than that at which it is desired to maintain the cathodes of the modulator tubes in the relaxed condition of the circuit. The grid of tube 28 thus draws no current during the period of relaxation, all of the current being diverted to the grid of tube 29 because of the lower potential of its cathode. Because of this the grids of the two tubes are normally held at potentials very close to the cathode potential of tube 29. Since this potential is fixed by resistances 34 and 35, the arrangement ensures that the initial negative swing of the grid of tube 28 will always start from the same point.

The circuit arrangement including tube 29 also serves to stabilize the cathode potential of the modulator tubes, particularly against the effects of tube variations such as occur due to aging. The modulator cathode potential in the relaxed condition is equal to the product of the plate current in tube 28 and the resistance of $R_8$. If, due to aging, the plate current should tend to diminish, then the cathode potential would likewise tend to diminish. Any such variation would, however, be accompanied by a change in the potential difference between the cathode and the fixed potential grid of such character as to bring about a compensating change in the plate current. It is also to be noted that the absence of grid current in tube 28 eliminates any effect that variations thereof might otherwise have on the cathode potential.

The extent of the initial negative swing of the grid potential in tube 28, which is determined by the plate current drop in $R_7$ is stabilized by the feedback effect of cathode lead resistor $R_8$ and depends principally on the potential maintained on the grid of tube 27 by the voltage divider comprising resistances $R_3$ and $R_9$, and the plate circuit of tube 26.

By virtue of the stabilizing arrangements described above substantial diminution of variations in the relaxation time of the modulator have been achieved. The use of the auxiliary output tube 29, to stabilize the grid and cathode potentials of tube 28 has been found in practice to reduce the variation incident to changing tubes to about one half the amount that occurred when the plate current to tube 28 was controlled only by the plate feed resistance.

*Pulse former*

The pulse forming system shown at 18 in Fig. 1A comprises tubes 36 and 37 and their associated circuits. The grid of tube 36 is connected to the plate of tube 29 through capacity $C_5$ and to ground through an inductance $L_2$. This inductance resonates with the capacitances of the tube and the wiring connected to the grid, indicated by the dotted lines, at 500,000 cycles per second and, with these capacities, constitutes the circuit in which the final pulses are formed. The pulse formations take place as follows: After the plate circuit of tube 29 has been blocked the plate potential builds up fairly quickly as $C_5$ is charged through the plate supply resistance so that before relaxation occurs $C_5$ becomes charged almost to the supply voltage. At the instant of relaxation tube 29 suddenly becomes conductive permitting $C_5$ to discharge through its plate circuit and so to develop an exciting pulse at the terminals of the tuned circuit. The oscillation takes place at the frequency of one-half million cycles per second and during the first half cycle drives the grid of tube 36 negative. The second half cycle tends to drive the grid positive but the flow of grid current absorbs the energy and prevents further oscillation. The resultant pulse is therefore substantially a single sinusoidal half wave of one microsecond duration. The pulse is repeated as an amplified positive pulse on the grid of tube 37 sufficiently strong to overload the tube and effect a squaring of the pulse shape. The plate voltage variation in tube 29 is shown in graph *e* of Fig. 4, the rising portion of which illustrates the effect of the charging current in condenser $C_5$, and the pulse on the grid of tube 36 is shown in graph *f*. Since this tube is shared in common by all of the even-numbered channels, additional pulses derived from the other channels will also appear. These are shown dotted in the figure. The additional pulses would also react on the plate potential of tube 29, but this effect is not indicated in the graph *e*.

The connection of the pulse forming system to the other even-numbered channels is made through lead 38, this lead going through other condensers similar to $C_5$ to the plates of the modulator output tubes corresponding to tube 29. The forming system for the odd-numbered channels is connected to the output side of tube 37 by lead 39. From this point the circuit goes on to the radio transmitter, shown at 19 in Fig. 1, through leads 40.

The use of duplicate pulse forming systems for the odd numbered and the even numbered channels instead of a single forming system for all channels results in a substantial reduction of the interchannel crosstalk. Such crosstalk may be produced in the forming system when a transient following the production of one pulse endures long enough to affect the timing of the subsequent pulse corresponding to a different channel. By using separate forming systems for the alternate pulses the time interval between successive pulses in each former is doubled and more complete disappearance of transients in the pulse intervals is ensured. Shorter channel periods than would otherwise be permissible can thus be used and the number of channels for a given recurrence period is increased.

*Upper channel group modulators*

The relaxation circuits for the upper channel group, 5 to 8, inclusive, are started together at the later point in the cycle when the oscillator voltage suddenly rises to its higher value. The division of the channels into the two groups and the starting of the relaxation circuits of the two groups at different times ensures sufficient time for each circuit to be restored fully to its stable condition before it is restarted for the next cycle. Since the circuits are started by positive pulses and do not respond to negative pulses, the positive pulses produced by differentiation when the oscillator voltage suddenly rises may be used directly without the help of an exciter tube. The relaxation circuit for one of the odd-numbered channels, for example channel 5, and its connection to the master oscillator are shown in the lower right hand portion of Fig. 2. The circuit comprises tubes 41 and 42 and is substantially the same as the circuit comprising tubes 27 and 28 except that the grid of the first tube is coupled to the oscillator directly through the differentiating network $C_6R_{11}$. Resistance $R_{11}$, of about 120,000 ohms, forms a potential divider with $R_{10}$, by means of which the steady value of the grid potential is fixed. This resistance takes the place of $R_9$ and the exciter tube plate circuit of channel 4 in so far as the function of determining the grid potential is concerned. The grid of tube 42 is connected by leads 43 and 44, respectively, to the load resistance of the signal amplifier and the grid of the output tube as in channel 4. The variation of the grid potential in tube 42 during the recurrence cycle is illustrated by graph *g* in Fig. 4.

*Marker generator*

Synchronizing pulses are generated at the start of each multiplex cycle by the marker generator comprising tubes 45 and 46. These pulses are distinguished from the signal pulses by their greater length, about 5 microseconds. Resistance $R_{12}$ and capacity $C_7$ in the input circuit of tube 45 produce a negative voltage pulse at the moment the oscillator output voltage drops to its lower value thereby blocking the plate circuit of the tube while the pulse lasts. The values of $R_{12}$ and $C_7$ are proportioned to produce an interruption of the desired length. The interruption results in a positive rectangular pulse at the plate of the tube which is repeated in the output of tube 46 as a corresponding negative pulse. These pulses are conveyed by lead 47 to the common input circuit of the radio transmitter. The whole array of pulses appearing at this point is illustrated by graph *h* of Fig. 4.

*Ringing*

The system provides for calling by the use of ordinary 20-cycle ringing currents in the connected wire lines. To transmit a call over a multiplex channel the ringing currents are caused to interrupt the signal pulses in that channel, thereby producing a signal at the receiving terminal in a manner described later. The ringing currents, separated from the signal currents by condenser $C_3$ are transmitted over leads 25 to a rectifier 48 the output current from which operates relay 49 to break the cathode connection of the relaxation circuit and stop the generation of the signal pulses.

*Receiving multiplex*

The schematic arrangement of the circuit is shown in the block diagram, Fig. 1*b*. High frequency pulse trains received by radio receiver 50 are rectified and the rectified pulses after suitable amplification are delivered to common amplifier 51 which forms the input stage of the multiplex equipment. At the output side of amplifier 51 the circuit divides. One branch goes to a second amplifier 56 and thence to eight different channel conductors through high resistances such as 57 leading to individual pulse converters such as 58. While the conductors are marked in the drawing with their respective channel numbers and the pulse converters are individual to the respective channels, it will be understood that all pulses appear in each channel at this point. The second branch goes to marker selector 52 in which the synchronizing pulses are separated from the channel pulses by virtue of their greater length and are passed on to amplifier 53 and thence to a square wave generator 54.

The square wave generator is a simple multivibrator type of oscillator, the oscillations of which are controlled and synchronized by the amplified marker pulses. Its wave form is nearly symmetrical, dividing the period into two almost equal parts. Pulses derived from the square wave are used to start a series of gate pulse generators such as 55, the purpose of these generators being to provide voltage pulses rectangular in form and coincident and about coextensive with their respective channel periods. The output circuits of the gate generators are connected to the corresponding signal pulse circuits branching from amplifier 56 so that the gate pulses are superimposed on the signal pulses at the inputs of the several pulse converters.

The pulse converters, such as 58, are relaxation circuits similar to those used in the channel modulators of the transmitter. They are arranged to be started by positive pulses and are so biased that they can be started only when a gate pulse and a signal pulse are present simultaneously in their input circuits. They are also arranged to relax at the end of the gate pulse. Consequently they operate to produce pulses which start with the occurrence of the appropriate signal pulses and stop at the end of the gate pulses and are therefore modulated in length according to the signal.

The signal is finally recovered by passing the length modulated pulses through low-pass filters, such as 59, which cut off at about 3500 cycles per second, and then through a signal amplifier 60 to the output line 61.

A second output circuit of the pulse converter delivers the converted pulses to a rectifier 62, the rectified output of which is supplied a ringing relay circuit 63. So long as signal pulses are present the ringing circuit is held inoperative, but on the disappearance of these pulses it operates and send an appropriate ringing signal over the outgoing line. The switching of the outgoing line is indicated in a conventional manner.

It is desirable to indicate failure to receive the marker pulses, since such failure would usually signify a breakdown at some point in the system. For this purpose the marker pulses from the output of the marker selector are supplied through a separate amplifier 64 to a marker alarm circuit 65. The absence of pulses results in the operation of the alarm circuit to display a suitable warning signal. At the same time the ringing circuits of the several channels are disabled by an interlocking connection through lead 66 so that failure of the marker pulses will not give rise to false calling signals in the connected circuits.

Figure 3:
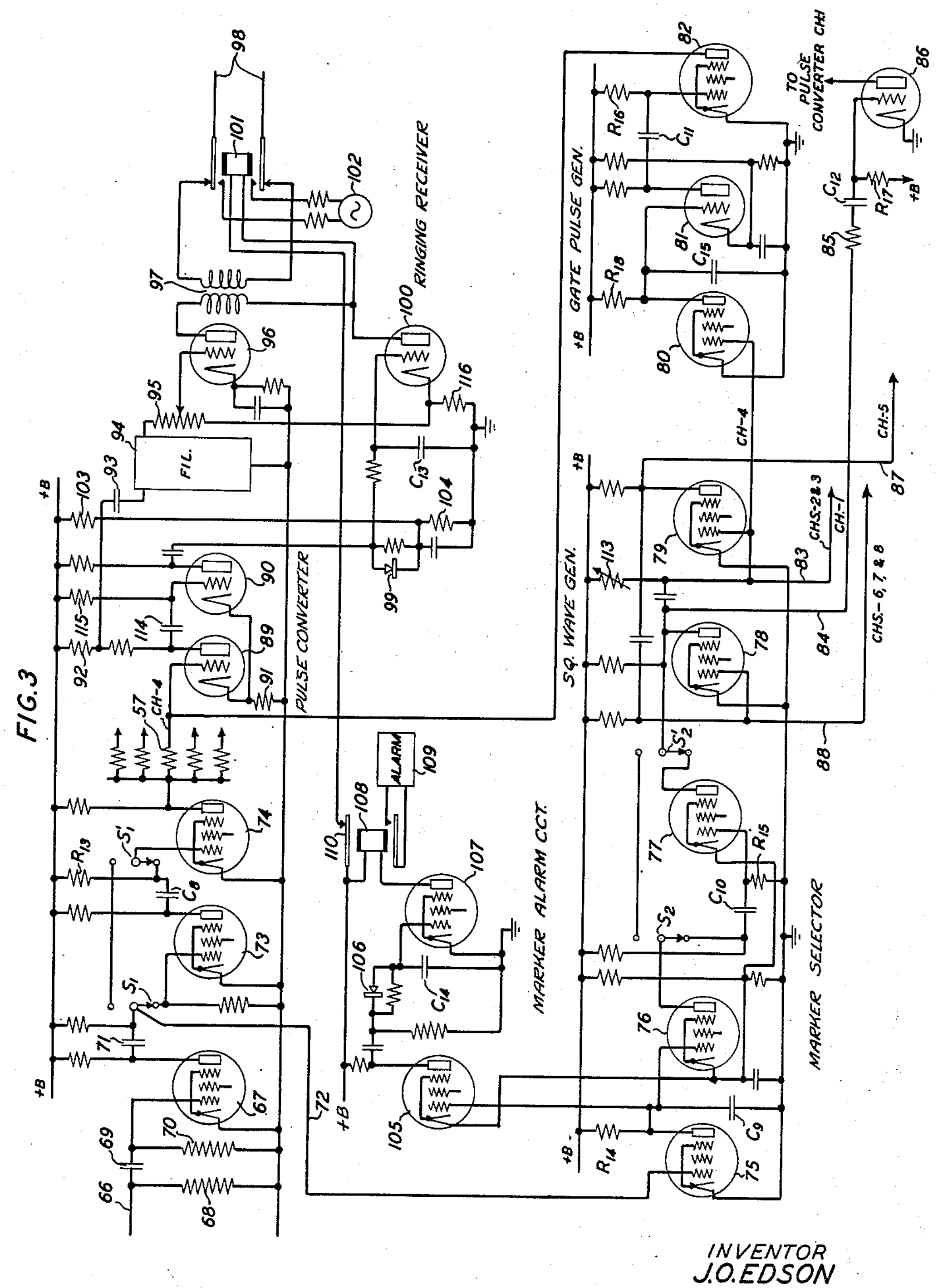
Fig. 3 is a circuit diagram of the receiving portion of the multiplex system.

The circuits of the receiving multiplex are shown in detail in Fig. 3. This includes the apparatus for a single channel, channel 4, together with the apparatus common to all channels.

*Common signal amplifiers*

Rectified and amplified pulses from the radio receiver enter the circuit on lead 66 and are applied to the grid of common amplifier 67 through an input network comprising low resistance 68, which matches the line from the radio receiver, blocking condenser 69 and grid leak resistance 70. The pulses at this point are of positive polarity. They are repeated at the output of tube 67 as negative pulses of increased amplitude and, after passing through blocking condenser 71, divide into two paths one following conductor 72 to the marker selector and the other passing through switch $S_1$ to the grid of pulse amplifier 73.

Amplifier 73 and its associated circuits provide for operating the pulse demodulating circuits from the trailing edges of the received pulses. As already pointed out, the timing of the trailing edges is generally quite definite when a pulse excited high frequency oscillator is used at the radio transmitter, while the timing of the leading edge is somewhat uncertain and subject to "jitter." To avoid the effects of this uncertainty tube 73 is used to generate new pulses of substantially fixed size and shape from the trailing edges of the received pulses. Its grid is held at a slightly positive potential relatively to its cathode and upon receiving a pulse from the preceding tube is driven sufficiently negative to block the plate circuit. The resulting positive pulse in the plate potential is differentiated by the action of differentiating network $C_8R_{13}$ whereby two pulses are produced at grid of the succeeding tube, 74, one a positive pulse at the start of the applied pulse and the second a negative pulse at the end. The first pulse has little effect at the output of tube 74, since the grid of that tube has a positive bias, but the second pulse drives the grid negative and produces a substantial momentary rise in the plate potential. From the output of tube 74 the circuit through a plurality of high resistances such as 57 to the individual channel demodulators.

The two switches $S_1$ and $S_1'$ in the input and output of tube 73 respectively permit that tube to be removed from the circuit if desired, by moving both to their upper contacts. When that is done the pulses are simply repeated through tube 74 and appear in the output thereof as positive pulses coincident with the input pulses. This connection may be used where the radio transmitter does not produce any uncertainty in the timing of the leading edge of the pulse.

*Marker pulse selector*

Negative pulses from the output of tube 67 are supplied through lead 72 to the grid of marker selector tube 75. Plate current is supplied through high resistance $R_{14}$ and the plate is shunted to ground through a timing condenser $C_9$. During the intervals between pulses the grid is held at a slightly positive potential and the plate potential is very low. When a negative pulse is applied to the grid the plate circuit is interrupted and condenser $C_9$ begins to charge and continues to charge until the pulse ends. Resistance $R_{14}$ and condenser $C_9$ are chosen to provide a relatively large time constant so that the rate of charging remains nearly constant in the time intervals involved. The voltage to which condenser $C_9$ becomes charged is therefore proportional to the pulse length, consequently the relatively long marker pulses will produce voltage several times as great as those produced by the short signal pulses.

The voltage pulses in condenser $C_9$ are applied to the grid of tube 76, the cathode of which is held by a potential divider, as shown, at a potential which is positive relative to the normal value of the grid potential. The bias thus produced is sufficient to block the plate circuit and to prevent the flow of space current except in response to the larger voltages produced by the marker pulses. These produce negative pulses in the plate potential of tube 76 which are transmitted through switch $S_2$ and differentiating network $C_{10}R_{15}$ to the grid of tube 77. Each pulse from tube 76 produces two pulses on the grid of tube 77, first a negative pulse and then a positive pulse, the latter being coincident with the trailing edge of the selected marker pulse. The cathode of tube 77 is held at the same positive potential as that of tube 76 so that the plate circuit is normally blocked. Because of this the tube responds only to the positive pulse produced by the differentiator.

*Square wave generator*

The plate of tube 77 is connected through switch $S_2'$ to the plate of tube 78 which together with tube 79 constitutes a multivibrator circuit of conventional type generating a nearly symmetrical wave of substantially rectangular form. It is synchronized by the negative pulses produced at the plate of tube 77 and to facilitate this, it is designed to oscillate at a frequency slightly lower than the frequency of the synchronizing pulses, namely, 8000 cycles per second. The start of the multivibrator cycle is thus timed by the trailing edge of the received marker pulse and is largely free from jitter.

By means of switches $S_2$ and $S_2'$ tube 77 and its differentiating circuit can be cut out of circuit in which case the multivibrator is controlled directly by the negative pulses at the plate of tube 76. In this condition the starting of the multivibrator cycle takes place very shortly after the appearance of the leading edge of the marker pulse and is timed in relation thereto.

The square wave generator serves to provide two points in the multiplex cycle from which the subsequent operations in the process of demodulation can be started and so permits the channels to be handled in two groups as in the transmitting multiplex. The first point is the start of the cycle which is coincident with the start of the time devoted to the signal periods. At this instant the multivibrator voltages suddenly reverse under the impact of the synchronizing pulse from tube 77 and this is coincident with the start of channel 1. The second is the time at which tube 79 becomes conducting and tube 78 is cut off. This time is controllable by adjusting resistance 113. It is adjusted to coincide with the start of the time assigned to channel 5. The gate pulse for channel 5 is generated by a differentiating circuit connected to the plate of tube 79. These are the conditions for trailing edge operation. For leading edge operation some slight readjustment of the multivibrator would be necessary and the network generating gate for channel 1 would be slightly different.

The voltage variations in the common portions of the circuit so far described are illustrated by graphs *i* to *n*, inclusive, of Fig. 4. These refer to leading edge operation. In graph *m* the dotted line represents the grid potential at which tube 76 just begins to conduct. Otherwise the diagrams with their legends are believed to be self-explanatory. In graph *t* the dotted lines indicate possible variation in pulse length due to variation in time of occurrence of pulse for channel 4.

*Gate pulse generation*

The gate pulse generators are individual to the several channels. Their function is to provide positive voltages coextensive with the respective channel times upon which the channel pulses from tube 74 are superimposed to selectively operate the pulse converting circuits. For channel 4 the gate pulse generator comprises tubes 80, 81 and 82 and their associated circuits. The operation of the gate generator for this channel is started at the instant the grid of tube 79 of the square wave generator swings to a negative potential, that is, at the end of the marker pulse. Since the final gate pulse has to coincide with the channel time for channel 4, its start must be appropriately delayed. For this purpose tube 80 and its output network $R_{18}$, $C_{15}$ are arranged to operate as a sweep voltage generator providing a voltage on the grid of tube 81 which blocks the plate circuit of that tube at the start of the voltage sweep and unblocks it at the beginning of the channel time.

The plate circuit of tube 80 is blocked and unblocked in synchronism with the square wave, being blocked during the time that the grid of tube 79 is negative. The plate potential is very low during the unblocked period, but starts to rise at the instant of blocking continues to rise as condenser $C_{15}$ charges. Tube 81 is normally blocked by virtue of a positive bias on its cathode, derived from a potential divider as shown, and does not become conductive until the voltage on $C_{15}$ rises to a suitable value. By proper proportioning of $R_{18}$ and $C_{15}$ this is made to take place at the start of the channel time for channel 4. Tube 81 continues in its unblocked condition so long as the grids of tubes 79 and 80 retain their negative polarity; that is, until the end of the first half of the square wave cycle. At that instant the tube is restored to its normal blocked condition.

At the moment tube 81 is unblocked, that is, at the start of the fourth channel period, its plate potential drops sharply and this drop is transferred to the grid of tube 82 through condenser $C_{11}$ driving it sufficiently negative to interrupt the plate current. The time constant of the circuit comprising $C_{11}$ and $R_{16}$ is adjusted to restore the grid potential to its unblocking value at the end of the channel period. At the start of the blocking interval the plate of tube 82, which is fed through high resistance 57 from the plate of signal amplifier 74, increases sharply providing a gate pulse which lasts throughout the channel period.

The successive stages in the formation of the gate pulse are illustrated by the graphs *p* to *s* of Fig. 4. In graph *q* the dotted line indicates the fixed bias to be overcome by the grid voltage in tube 81 before the tube becomes conductive. With respect to graph *r* it may be noted that the voltage required to cut off the plate current is small in comparison to the peak voltage of the pulse. Graph *s* shows the gate pulse with the fourth channel signal pulse superimposed on it and also the signal pulses of the other channels.

The grid of tube 79 also controls the gate pulse generators for channels 2 and 3 over lead 83. These generators are similar to the generator in channel 4, differing only in the constants of the sweep circuits corresponding to $C_{10}$, $R_{15}$, which are proportioned to produce the appropriate time delays.

Since the first channel period starts at the moment the grid of tube 79 is driven negative, no delay is necessary and a simpler gate generator may be used. The simplified generator comprises tube 86 the grid of which is connected to the plate of tube 78 through timing circuit $C_{12}$, $R_{17}$, high resistance 85 and lead 84. The plate of tube 78 drops in potential at a time slightly too early for channel 1. This drop is transferred to the grid of tube 86, delayed slightly by series resistor 85 working into the tube capacity, driving it negative and blocking the plate circuit. The grid potential is restored by charging $C_{12}$ through $R_{17}$ and unblocks the tube at the end of the channel period.

The gate pulse generator for channel 5 is similar to that for channel 1 except that resistor 85 is not needed. It is controlled from the plate of tube 79 over lead 87. The plate potential of this tube drops sharply at the beginning of the fifth channel period, consequently no delay is needed. The generators for channels 6, 7 and 8 are similar to that in channel 4 and are controlled over lead 88 from the grid of tube 78 which also is driven negative at the start of the fifth channel period.

The division of the gate generators into two groups started at different points in the multiplex cycle ensures that the various timing and sweep circuits all have ample time to be restored to their normal conditions between successive operations.

*Pulse converter*

The pulse converter for channel 4 comprises tubes 89 and 90 which with their associated circuits constitute a relaxation circuit or one-shot multivibrator of the same type as is used in the transmitting multiplex. The converters for the other channels are of the same type. In the relaxed condition of the circuit tube 90 is conductive and tube 89 is blocked. The cathode of the latter tube is held at a positive potential by the flow of the plate current in tube 90 through cathode lead resistor 91. The grid is connected to the plate of gate generator tube 82 and to the plate of signal pulse amplifier 74 through resistor 57 and is normally at a very low positive potential. The effective grid bias is such that it cannot be overcome by either the gate pulse or a signal pulse alone, but requires the sum of the two. The gate pulse thus holds the circuit in a prepared condition during the channel period so that it is selectively operated by the proper channel pulse. The variation of the voltage on the grid of tube 89 is shown by graph *s* of Fig. 4.

The simultaneous presence of the gate pulse and a signal pulse at the grid of tube 89 causes the sudden transfer of the plate current to that tube from tube 90. The circuit is so adjusted that it does not return to its relaxed condition immediately the signal pulse has passed, but is held in its strained condition until the end of the gate pulse. To this end the time constant of resistor 115 and condenser 114 is made long compared to the time assigned to a channel. When current flows to plate of tube 89 the grid of tube 90 is driven negative cutting off the plate current and allowing the cathode potential to drop sufficiently to ensure that tube 89 remains conductive until the gate pulse has ended. When the gate pulse ends tube 89 is driven to cut off and tube 90 becomes conductive.

The action of the circuit is such that the plate current in tube 89 flows in pulses which last from the appearance of the signal pulse until the end of the gate pulse and which are therefore modulated in length with the leading edges varying in accordance with the transmitted signal. The character of the pulses is shown by graph *t* of Fig. 4 the dotted lines indicating the range of variation of the pulse length.

*Signal output circuit*

The varying length pulses contain the signal which is easily recovered by passing the pulses through a low-pass filter and amplifying the filtered currents. A pulsing voltage is obtained from a tap in the load resistance 92 for tube 89 and is led through blocking condenser 93 to low-pass filter 94 which may have a cut-off at about 3500 cycles per second for speech signals. The filtered signal is transmitted through potentiometer 95 to audio amplifier 96 and thence through transformer 97 to line 98 which may lead to a conventional telephone switchboard.

*Ringing and alarm circuits*

As already explained ringing is effected by suppressing the pulses in the particular channel over which the call is being made. At the receiver, the normal pulsing output of the pulse converter is utilized to maintain a local ringing circuit in a disabled condition and the disappearance of these pulses causes the circuit to operate and produce the call signal.

The pulsing output is derived from the plate of tube 89 of the converter circuit and is supplied to shunted rectifier 99, the rectified output of which builds up a negative charge on condenser $C_{13}$ sufficient to block the plate circuit of tube 100. When the pulses disappear the bias in this tube is removed and the flow of plate current causes relay 101 to operate and connect a source of ringing current 102 to the outgoing line. To ensure its prompt operation in the absence of pulses, the grid of tube 100 is biased to a slightly positive fixed potential by potential divider 103, 104. As a further means for ensuring reliable operation of relay 101, the output of tube 100 is supplemented by current from tube 96. For this purpose resistor 116 is provided in the cathode lead of tube 100 and the potential drop across this resistor is applied to the grid of tube 96 by way of potentiometer 95. Accordingly when tube 100 becomes conductive, the grid of tube 96 receives an additional positive bias which increases its plate current.

To indicate a failure to receive the marker pulses a separate alarm circuit is provided. Pulses from condenser $C_9$ in the marker selector circuit are applied to the grid of tube 105 which is biased sufficiently to make it responsive only to the larger amplitude pulses developed by the received marker pulses. These pulses produce corresponding negative pulses at the plate of the tube which pass through shunted rectifier 106 to condenser $C_{14}$. The negative voltage built up in condenser $C_{14}$ is applied to the grid of tube 107, blocking the flow of plate current and holding relay 108 unoperated. The disappearance of the marker pulses results in the operation of relay 108 and the closing of a circuit containing a suitable alarm device 109.

Since the failure of the marker pulses would generally be accompanied by failure of all pulses, it would result in the operation of all of the ringing relays and the transmission of false calling signals over all of the connected lines. To avoid this the current to the ringing relays and tubes is supplied through a contact 110 of the marker alarm relay. This contact is opened when the alarm relay operates and operation of the ringing relays is prevented.

What is claimed is:

1. The method of multiplex telephony which comprises producing successive frames of pulses each frame comprising an initial pulse of relatively long duration and a succession of short uniform signal pulses, one for each speech channel, following at normally equal time intervals, the frames of pulses recurring periodically at a rate substantially higher than the highest speech frequency to be transmitted, modulating the time positions of the signal pulses corresponding to the several channels by separate speech signals, receiving the pulses after transmission through a common medium, separating the longer initial pulses, producing therefrom a plurality of gating pulses at successive times corresponding to the several channel periods, and combining the received signal pulses with the respectively corresponding gate pulses to separate and detect the signals in the different channels.

2. The method of multiplex telephony which comprises producing successive frames of pulses, each frame comprising an initial pulse of relatively long duration and a suggestion of short uniform signal pulses, one for each speech channel, following at normally equal time intervals, the frames of pulses recurring periodically at a rate substantially higher than the highest speech frequency to be transmitted, modulating the time positions of the signal pulses corresponding to the several channels by separate speech signals, receiving the pulses after transmission through a common medium, separating the longer initial pulses, producing therefrom a plurality of gating pulses at successive times corresponding to the several channel periods, deriving from the trailing edges of the received signal pulses new pulses timed by said trailing edges, and combining said new pulses with the respective gate pulses to separate and detect the signals of the different channels.

3. In a time division multiplex telephone system in which signals are transmitted as time modulations of uniform short pulses recurring periodically at a rate substantially greater than the highest signal frequency employed, sending means comprising circuits defining a plurality of channels, a relaxation circuit individual to each channel, means for deriving short pulses from said relaxation circuits at their instants of relaxation, said relaxation circuits operating cyclically to produce a sequence of channel pulses in each recurrence period, a source of oscillations the frequency of which determines the pulse recurrence period, and means for controlling the starting of the relaxation circuits of one group of contiguous channels at one point in each cycle of oscillations from said source, and means for controlling the starting of the relaxation circuits of another group of contiguous channels at a later point in each cycle of oscillations from said source.

4. In a time division multiplex telephone system in which signals are transmitted as time or phase modulations of periodically recurrent short pulses, sending means comprising circuits defining a plurality of message channels, pulse generators comprising relaxation circuits individual to each channel operating cyclically to produce a sequence of channel pulses in each recurrence period, a source of oscillations the frequency of which determines the recurrence period, means for controlling the starting of the relaxation circuits of one group of contiguous channels at one point in each cycle of oscillations from said source, and means for controlling the starting of the relaxation circuits of another group of contiguous channels at a later point in each cycle of oscillations from said source, speech input circuits individual to each channel, and means for varying the relaxation times of said relaxation circuits in accordance with speech currents whereby the time positions of the signal pulses are similarly varied.

5. In a time division multiplex system in which signals are transmitted as time or phase modulations of uniform short pulses, transmitting means comprising circuits defining a plurality of speech signal channels, modulated pulse generators individual to said channel, said generators operating in succession during each multiplex period, a common transmission path, a pair of amplitude limiting circuits coupled at their output to said common path, said limiting circuits being adjusted to transmit only voltages greater than a finite fixed value, and circuits so coupling said signal channels to the input terminals of said limiters that each limiting circuit receives only alternately generated pulses.

6. In a time division multiplex system in which signals are transmitted as time or phase modulations of uniform short impulses, transmitting means comprising circuits defining a plurality of signal channels, generators operating in succession during each multiplex period to produce a sequence of exciting impulses normally uniformly spaced in time, means for modulating the timing of the exciting pulses in accordance with signal currents in the respective channels circuits, a common transmission path, a pair of pulse forming circuits coupled at their output terminals to said common path, said forming circuits producing in response to exciting pulses impressed upon their input terminals, short pulses of uniform length and substantially rectangular wave form, circuits coupling those of said generators producing pulses of odd order in the sequence to one of said forming circuits, and circuits coupling the others of said generators to the other forming circuit, whereby each of said pulse forming circuits receives only alternate exciting pulses.

7. In a time division multiplex telephone system in which signals are transmitted in a common path as time modulations of uniform short pulses, and in which the signal pulses for the several channels are transmitted in sequences separated by synchronizing pulses, receiving means comprising a plurality of signal circuits, one for each channel, and an additional synchronizing circuit coupled to said common path, relaxation circuits included in said signal circuits and connected to receive signal pulses, means in said synchronizing circuit for selecting the synchronizing pulses, pulse generating means in said signal circuits operating under the control of the selected synchronizing pulses to generate gating pulses substantially coincident and coextensive with the respective channel periods, and connections for impressing the gating pulses upon the relaxation circuits together with the corresponding signal pulses, whereby the relaxation circuits are caused to generate length modulated pulses lasting from the time of occurrence of the signal pulse to the end of the gate pulse.

8. In a time division multiplex telephone system in which signals are transmitted in a common path as time modulations of periodically recurrent short pulses and in which the signal pulses for the several channels are transmitted in sequences separated by longer synchronizing pulses, the method of reception which comprises selectively receiving the synchronizing pulses, deriving new synchronizing pulses from the trailing edges of the selected pulses, producing under the control of the derived synchronizing pulses a succession of gate pulses coextensive and coincident with the several channel periods, deriving new signal pulses from the trailing edges of the received pulses, and combining the derived signal pulses with the respectively corresponding gate pulses to separate and detect the signals in the different channels.

9. A multichannel transmitting system comprising a source of pulses, retardation means to retard by different amounts the energy of said pulses thereby producing a plurality of differently timed trains of pulses from said source, each train representing a channel for communication, means producing a train of unretarded pulses of longer duration than the pulses of the other trains for use as synchronizing pulses, means to modulate the pulses of the retarded trains in time relative to the timing of said synchronizing pulses according to instantaneous values of signal intelligence, and transmitter means for transmitting said trains of pulses in the form of a single train.

10. A multichannel modulator system comprising a plurality of modulators each including means for producing a plurality of separate series of signal modulated pulses, each series representing a different signalling channel, and means for controlling said modulators to space the adjacent channels in each modulator a relatively wide interval while maintaining relatively close spacing of channels in adjacent modulators.

11. A multichannel modulator system comprising a plurality of modulators each including means for producing a plurality of separate series of signal modulated pulses, each series representing a different signalling channel, and means for synchronizing said modulators to interleave the output pulses thereof into a single train of pulses.

12. A multichannel modulator system comprising a plurality of modulators each including a plurality of separate signal controlled means for producing separate series of signal modulated pulses, means for preventing interference between the signal controlled means of each modulator, and means for synchronizing said modulators to interleave the output pulses thereof into a single train of pulses.

13. A system for translating time displacement modulation signal pulses into output pulses whose width varies according to said displacement comprising, means for producing constant repetition rate control pulses in synchronism with the signal pulses in their unmodulated state, each of said control pulses having a width covering the entire range of displacement of the corresponding signal pulse, a tripping circuit having two levels of stability, means for biasing said circuit to maintain it at a first one of said stability levels, said bias having a value such that the combined amplitudes of a control pulse and signal pulse are required to produce tripping to the second stability level while the control pulse alone is sufficient to maintain the circuit at said second level, means for applying the control pulses and the time displacement modulated signal pulses to trip said circuit to said second level at the time of application of a signal pulse, and to permit return to said first level at the end of the corresponding control pulse, and means for deriving from said circuit variable width output pulses.

14. A system according to claim 13, wherein said circuit is a multivibrator.

15. A system according to claim 13, wherein said control pulses are substantially rectangular.

16. An arrangement for translating time displacement modulation signal pulses into output pulses whose width varies according to said displacement, in a communication system in which synchronizing pulses of constant repetition rate are each followed by a signal pulse having a time displacement with respect to the associated synchronizing pulse that varies according to instantaneous values of the intelligence to be conveyed comprising, means for producing under the control of said synchronizing pulses control pulses synchronized with said synchronizing pulses and having a width covering the entire range of displacement of the corresponding signal pulse, a tripping circuit having two levels of stability, means for biasing said circuit to maintain it at a first one of said stability levels, said bias having a value such that the combined amplitudes of a control pulse and signal pulse are required to produce tripping to the second level while the control pulse alone is sufficient to maintain the circuit at said second level, means for applying the control pulses and the time displacement modulated signal pulses to trip said circuit to said second level at the time of application of a signal pulse and to permit return to said first level at the end of the corresponding control pulse, and means for deriving from said circuit variable width output pulses.

17. A system according to claim 16, wherein said tripping circuit is a multivibrator.

18. A system according to claim 16, wherein said control pulses are substantially rectangular.

19. An arrangement for translating time displacement modulation signal pulses into output pulses whose width varies according to said displacement and for distributing said output pulses into separate channels, in a multichannel pulse communication system in which a single pulse train consists of a plurality of regularly repeated synchronizing pulses each associated with a plurality of signal pulses forming parts of separate channels and having a time displacement with respect to their associated synchronizing pulse that varies according to the instantaneous value of the intelligence to be conveyed comprising, means for producing under the control of said synchronizing pulses control pulses synchronized with said synchronizing pulses and having a width covering the entire range of displacement of each one of the signal pulses, a plurality of tripping circuits each forming a part of a separate channel and each having two levels of stability, means for biasing each of said circuits to maintain it at a first one of said stability levels, said bias having a value such that the combined amplitudes of a control pulse and signal pulse are required to produce tripping to the second level while the control pulse alone is sufficient to maintain the circuit at said second level, means for applying the control pulses successively to said tripping circuits to successively prepare them for tripping to said second level during the interval allotted to their corresponding channel, means for applying the time displacement modulated signal pulses in parallel to said circuits to trip the corresponding channel circuit to said second level upon application of the proper signal pulse, and to permit return to said first level at the end of the associated control pulse, means for deriving from each of said circuits output pulses corresponding in width to the displacement of the associated signal pulses, and means for applying said output pulses to separate loads.

20. A system according to claim 19, wherein said control pulses are rectangular.

21. A system according to claim 19, wherein said circuits are multivibrators.

References Cited in the file of this patent

UNITED STATES PATENTS

| Number | Name | Date |
|---|---|---|
| 1,918,252 | Dunham | July 18, 1933 |
| 2,048,081 | Riggs | July 21, 1936 |
| 2,157,434 | Potter | May 9, 1939 |
| 2,172,354 | Blumlein | Sept. 12, 1939 |
| 2,262,838 | Deloraine et al. | Nov. 18, 1941 |
| 2,313,906 | Wendt | Mar. 16, 1943 |
| 2,403,210 | Butement | July 2, 1946 |
| 2,414,265 | Lawson | Jan. 14, 1947 |
| 2,478,919 | Hansell | Aug. 16, 1949 |
| 2,478,920 | Hansell | Aug. 16, 1949 |